United States Patent [19]

Pelta

[11] 4,138,825

[45] Feb. 13, 1979

[54] METHOD AND APPARATUS FOR PROVIDING RUNOUT COMPENSATION

[75] Inventor: Edmond R. Pelta, Pacific Palisades, Calif.

[73] Assignee: FMC Corporation, San Jose, Calif.

[21] Appl. No.: 836,658

[22] Filed: Sep. 26, 1977

[51] Int. Cl.$^2$ .................. G01B 19/295; G01B 19/575
[52] U.S. Cl. ................................. 33/228; 33/203.18; 33/288; 33/301; 33/336; 356/152
[58] Field of Search ....... 33/174 Q, 180 AT, 181 AT, 33/203.18, 203.19, 228, 275 R, 288, 301, 336, 354; 356/152, 155

[56] References Cited

U.S. PATENT DOCUMENTS

| | | | |
|---|---|---|---|
| 3,445,936 | 5/1969 | Wilkerson | 33/203.18 |
| 3,689,161 | 9/1972 | Lill et al. | 33/288 |
| 3,782,831 | 1/1974 | Senften | 33/288 |
| 3,892,042 | 7/1975 | Senften | 33/203.18 |
| 3,901,094 | 8/1975 | Humbert | 33/336 |

Primary Examiner—Richard R. Stearns
Attorney, Agent, or Firm—Robert S. Kelly

[57] ABSTRACT

An apparatus and a method of providing runout compensation for wobble present in the measurements made of the orientation of a rotary body relative to at least a pair of planes, and including at least a pair of sensors for providing measurements angularly related to each other and with the sensors coupled to the body for providing signals representative of the measurements of the rotary body relative to at least the pair of planes at a particular angular relationship. The body is rotated through a plurality of positions for providing signals representative of the measurement of the body relative to the pair of planes at the different positions. A first output signal is produced and is representative of the orientation of the body relative to one of the planes in accordance with the measurements at the different positions in the one plane and with the measurements in the one plane used to provide a runout compensation for wobble present in the measurements. A second output signal is produced and is representative of the orientation of the body relative to the other of the planes in accordance with the measurements at the different positions in both planes and with the measurements in the one plane used to provide a runout compensation for wobble present in the measurements in the other plane.

16 Claims, 14 Drawing Figures

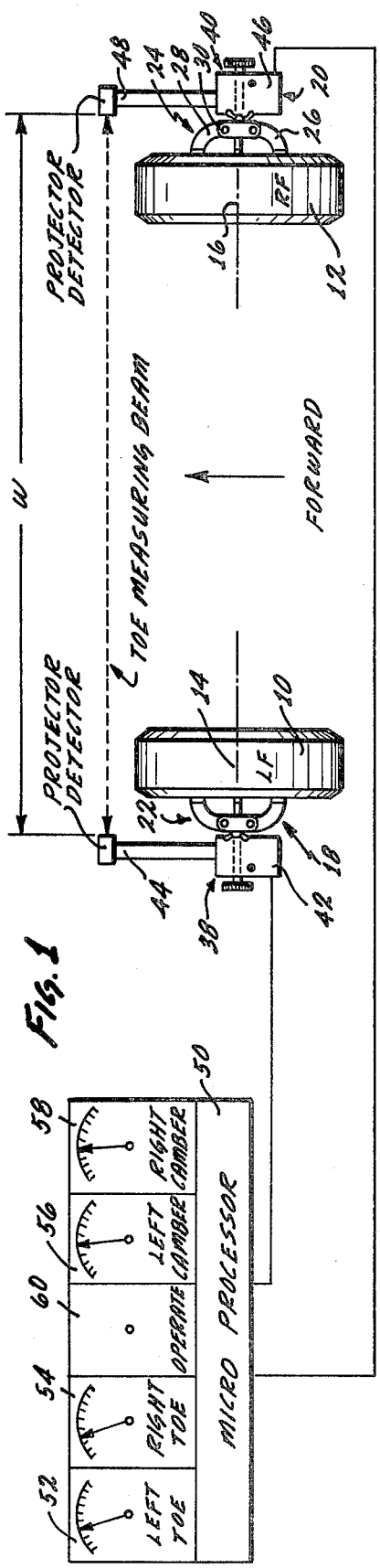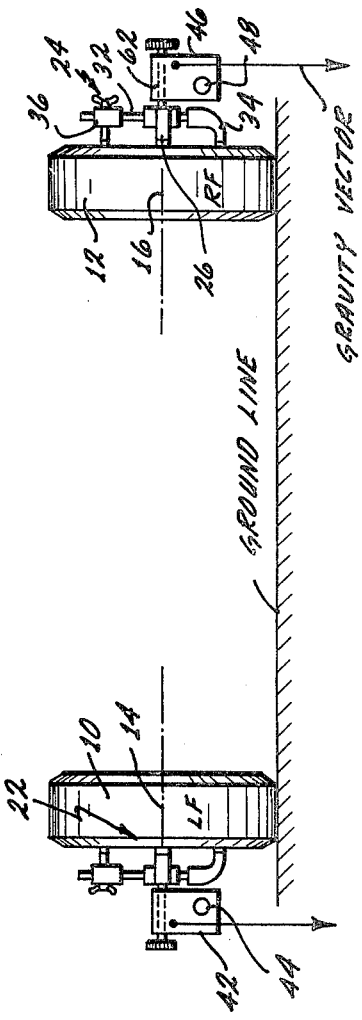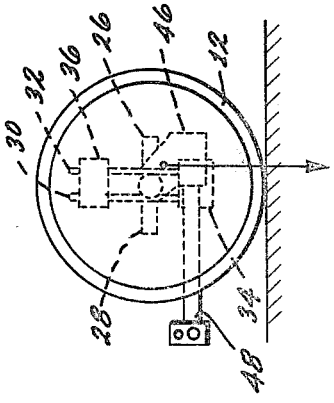

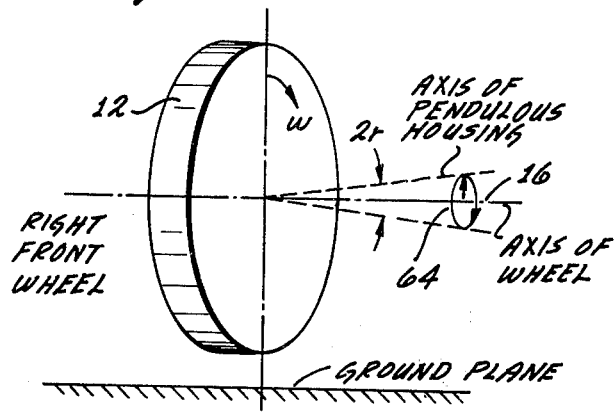
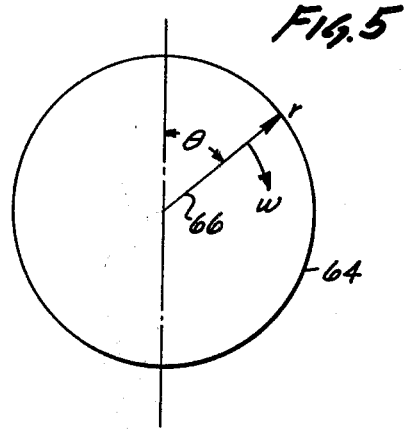
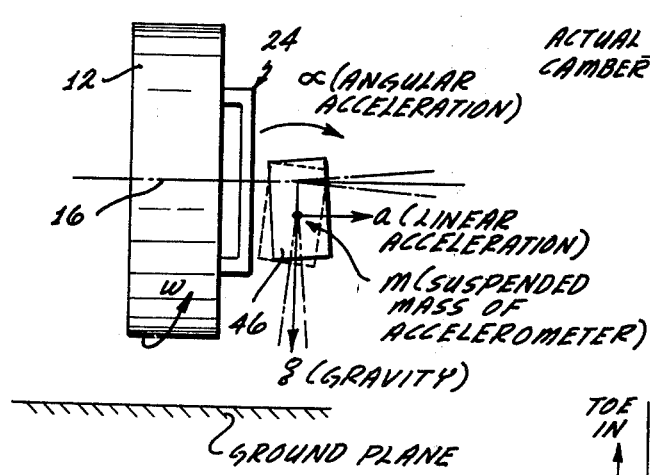
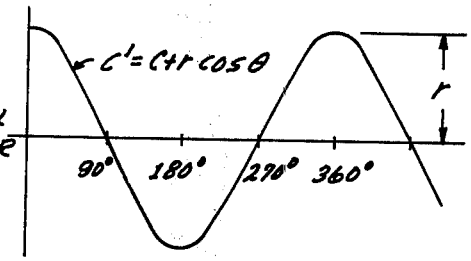
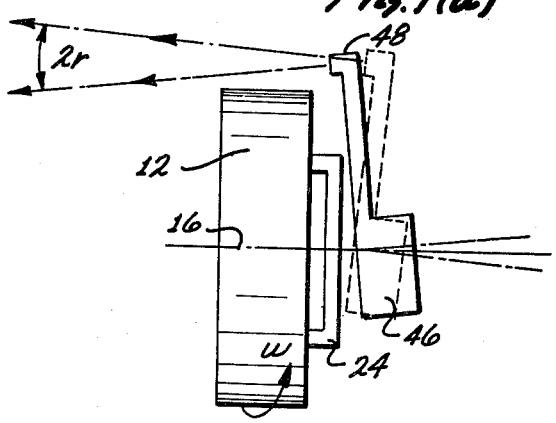
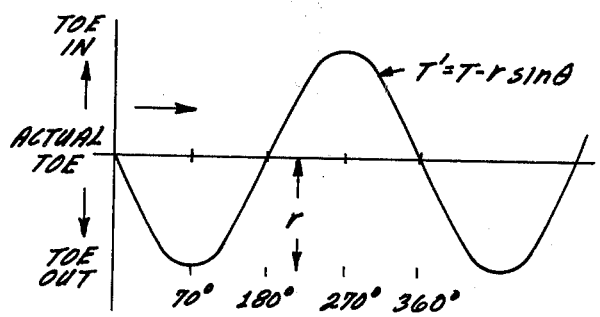

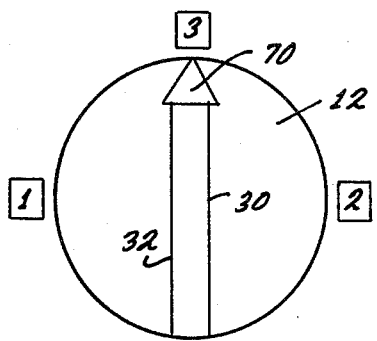
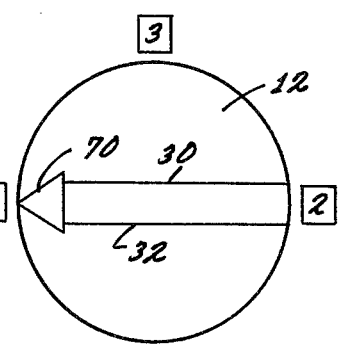
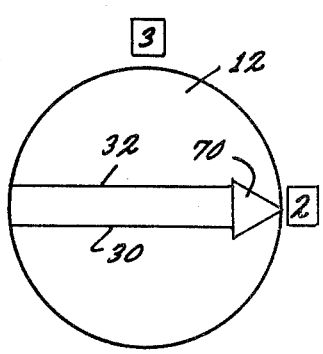
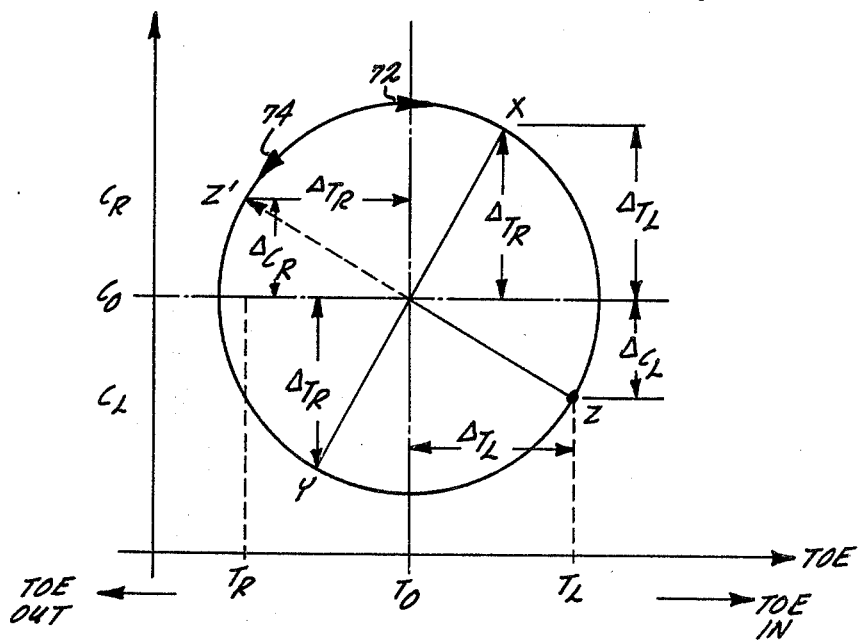

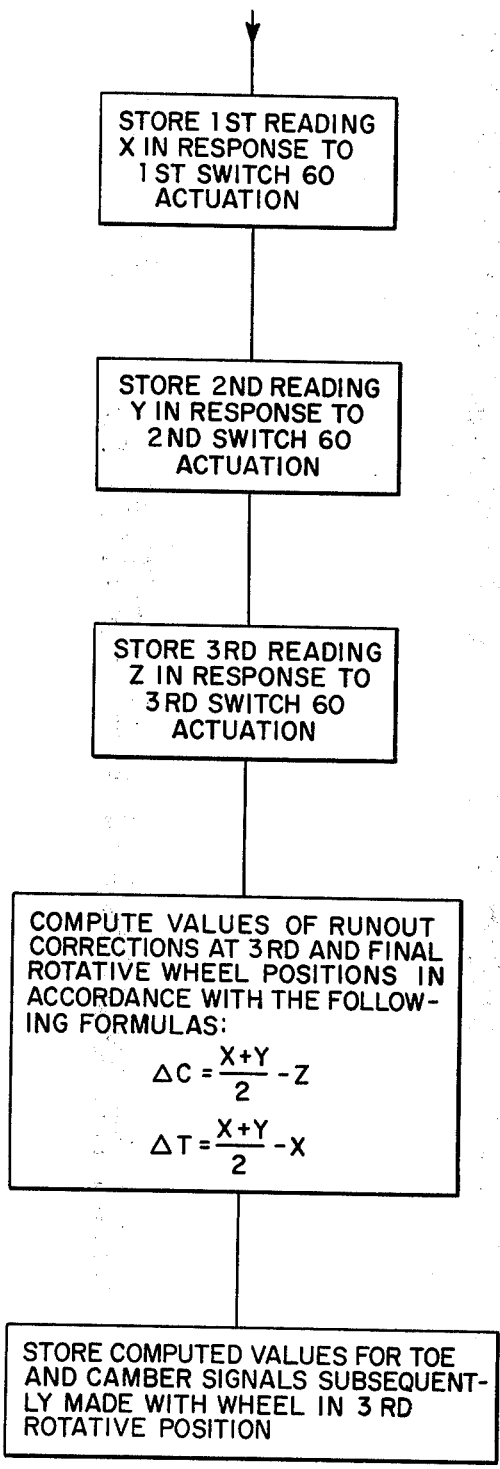

METHOD AND APPARATUS FOR PROVIDING RUNOUT COMPENSATION

CROSS REFERENCE TO RELATED APPLICATIONS

The present application claims subject matter which is disclosed but not claimed in the co-pending application of Melvin H. Lill et al, Ser. No. 889,167, filed Mar. 23, 1978 and entitled Runout Compensation In Vehicle Wheel Alignment Measuring Apparatus.

The present invention relates to a method and apparatus for providing runout compensation for a rotating body. Specifically, the runout compensation is provided as part of a system for measuring particular characteristics of the rotating body such as the orientation of the body with respect to a pair of angularly related planes. These characteristics may be measured, as an example, by the measurement apparatus mounted on the body and wherein the apparatus, when mounted on the body, may include an angular relationship rather than a true relationship to the axis of rotation of the rotating body. This angular relationship would provide wobble components in any output measurements of the orientation of the body to the pair of planes. The present invention, therefore, provides for a method and apparatus for compensation for this wobble which type of compensation is normally referred to as runout compensation.

A particular type of apparatus for which the present invention may be used is apparatus which measures the camber and toe of a wheel of a vehicle. When measurement apparatus is mounted on the wheel of the vehicle such as on the wheel rim so as to provide for these measurements, the plane of the wheel rim may not be exactly perpendicular to the axis about which the wheel rotates. In addition, the measurement apparatus itself may not be exactly mounted on the wheel rim so that it is in a plane parallel to the wheel rim which again could contribute to the measurement apparatus not being mounted in a true relationship to the axis of rotation of the wheel.

In the past, such a misalignment has normally been compensated for by mechanical means which provide for adjustments in the positioning of the measurement apparatus on the wheel rim. In this way, the mechanical means may be adjusted to a position wherein the measurement apparatus has a true relationship to the axis of rotation of the wheel and wherein the measurement apparatus does not wobble relative to the axis of rotation of the wheel. This type of mechanical compensation can provide for the elimination of the wobble component in output measurements, but such mechanical compensation is time consuming and is very dependent on the skill of the operator of the measurement equipment. A more desirable method of providing for such runout compensation would be to mount the measurement apparatus on the wheel and then rotate the wheel through different positions to provide for various measurements of camber and toe and with the equipment itself providing electronically for runout compensation during the measurement of the camber and toe.

A specific example of such an electronic runout compensator showing a particular method of runout compensation plus a system for providing electronically measurements of camber and toe is shown in Senften U.S. Pat. No. 3,892,042, and in Senften U.S. Pat. No. 3,782,831. These patents show a system for providing measurement of camber and toe and incorporate a specific type of electronic runout compensation. The present invention is directed to an improved method of runout compensation which could be used with other types of systems for obtaining runout measurements in addition to the specific type of system shown in this application. Specifically, the invention will be described with a method of runout compensation different from that shown in the Senften patents.

Generally, the method of runout compensation shown in the Senften U.S. Pat. No. 3,892,042 is provided by providing readings at two points 180° apart. This type of system may be thereby referred to as a two-point runout compensation system and, in addition, provides for the runout compensation independently in both the measurement in the camber plane and in the measurement in the toe plane. The present invention is provided for in a method of runout compensation wherein measurements are taken at three points and may be generally referred to as a three-point runout compensation system. However, the present invention does not provide for the runout compensation being independently produced for both the camber and toe planes but rather the runout compensation is provided for in both planes by the measurements in one plane. Specifically the measurements in the camber plane are used to provide for runout compensation for the measurements in the toe plane. In a mathematical sense the compensation is translated from one plane to the other plane and this technique may be used with other procedures for obtaining the runout measurements.

As a general background, it should be noted that all of the runout compensation systems which have been considered until the present invention have generally involved independently measuring the runout in both the camber and toe planes and then performing a runout correction for both of these runout components independently of each other and using the measurements from each plane separately. However, the two measurement planes are not independent of each other. For example, the wheel which is being measured is mounted so that the plane of the wheel falls on some angle relative to the axis of rotation of the wheel. A complete description of the relationship between the axis of rotation of the wheel and the axis of support of the measurement equipment will completely describe the runout which will be experienced by both the camber and toe measurement sensors. Therefore, if the parameters of the runout are determined in either the camber or toe plane, one could then compute the correction required in the other plane. The present invention is therefore directed to such a runout compensation system wherein the parameters of the runout are determined in a first plane such as the camber plane and the correction is then computed from the measurements in the camber plane and provided in the other plane such as the toe plane.

The system of the present invention for providing runout compensation by determining the runout parameters only in a single plane can produce several important advantages. Specifically, in the actual implementation of a system for measuring camber and toe the measurements in the camber plane are much easier to make while the wheel is rotated from position to position in comparison to measurements in the toe plane. This is because the sensors that are normally used for making measurements in the camber plane are not subject to losses of signal due to motions of the arms of the alignment equipment which could cause information detected by the toe sensor to be momentarily lost. In addition, if there is a substantial motion of the arms of the alignment equipment up and down during the time that the wheels are being rotated, this substantial motion produces a negligible error in the camber plane because the camber angle sees only that motion multiplied by the sine of the swing angle. For angles around 10° to 20° of swing, this is a very small error whereas it could be enough to keep the toe sensor completely out of operation.

Another advantage of using the measurement of runout compensation in one plane and then computing the compensation for the other plane, is that this type of mathematical computation is particularly applicable to modern electronic processor equipment. Therefore, the runout compensation system of the present invention makes the most efficient use of the state of the art equipment and provides for great flexibility in making modifications to the system.

Another advantage of the runout compensation system of the present invention is that since the system only makes measurements for runout in a single plane, the system would not have to use the toe measurement equipment in any way for compensating for runout. Therefore, if the runout measurements are made while the wheel is being continuously rotated, this means there would be no limitations of the rotational speed of the wheel during such runout measuring process, or at least there will be no limitations imposed by the scanning rate of the toe measuring system. Since the scanning rate of the toe measuring system is normally somewhat limited, this gives greater flexibility and accuracy to the runout compensation system of the present invention. Also because the runout compensation system of the present invention does not use the toe measurements for toe compensation, the input data for the runout computation is not subject to the quantatizing error inherent in the toe input systems.

In a specific implementation of a runout compensation system using the present invention, the measurement equipment would be initially mounted on the rim of each of the right and left tires of the vehicle. The equipment is normally mounted on the rim using crossbars which span the rim and these crossbars could initially be positioned vertically for ease of installation. In a first step, one of the wheels is rotated 90° and a reading is then taken. The wheel is then rotated a further 180° to a second point and a second reading is taken. The wheel is then rotated a further 90° to a third point and a third reading is taken. These readings then provide sufficient information to produce output signals representing camber and toe. The readings in one plane are used to provide runout compensation in the one plane. For example, this may be the camber plane. Further, the readings in the one plane are used to provide for a calculation of the runout compensation in the other plane such as the toe plane. In this way output signals representative of the camber and toe are both compensated for runout by readings made in the camber plane.

It should be appreciated that although the invention will be described with reference to a three-point runout compensation system, the system provides for deriving runout measurement in both planes from measurements in one plane and may be used with other runout measurement systems. Also it should be appreciated that the invention will be described with reference to a system wherein the sensors are mounted on the wheel but other systems wherein the sensors are not mounted on the wheel may also be used.

A clearer understanding of the invention will be had with reference to the following description and drawings wherein:

FIG. 1 illustrates a plan view of the front wheels of a vehicle and including a wheel alignment measuring system mounted on the vehicle wheels;

FIG. 2 illustrates a view of the vehicle wheels and wheel alignment measuring system of FIG. 1 from behind the wheels;

FIG. 3 illustrates a side view of the right front vehicle wheel and the measuring equipment mounted thereon from a position between the vehicle wheels;

FIG. 4 illustrates the right front wheel and the generation of a runout circle;

FIG. 5 illustrates the error vector as it produces the runout circle;

FIG. 6a illustrates the camber measuring system and FIG. 6b illustrates the generation of the camber signal including the runout error through a revolution of the wheel;

FIG. 7a illustrates the toe measurement system and FIG. 7b illustrates the toe signal including the runout error through a revolution of the wheel;

FIGS. 8a, 8b and 8c illustrate the three rotative positions of the wheel at which the measurements may be taken in order to provide for the determination of camber and toe and with the elimination of runout error; and FIG. 9 illustrates a runout circle for the three-point measurement system shown in FIG. 8 and with the determination of various measurements at the different points to provide measurements in the camber and toe planes and with these measurements used to compensate for runout.

FIG. 10 is a flow chart illustrating the operations performed by the microprocessor in the circuitry of the present invention.

In FIG. 1, a plan view of a wheel alignment measurement system is shown looking down on the two front wheels of a vehicle and including a left front wheel 10 and a right front wheel 12. The forward direction is as marked in FIG. 1. The axis on which the left front wheel rotates is shown as axis 14 and the axis on which the right front wheel rotates is shown as axis 16. The wheels actually include a supporting rim mounted for rotation on the axis with a rubber tire mounted on the rim.

A separate wheel alignment measuring apparatus is mounted on the rim of each of the wheels 10 and 12 and includes a first apparatus 18 and a second apparatus 20. The first apparatus 18 is mounted through mounting structure 22 on the left wheel and the second apparatus 20 is mounted on the right wheel 12 by mounting structure 24. Specifically, the mounting structure may be seen in greater detail in FIGS. 2 and 3 and is substantially identical for both right and left wheels.

The mounting structure for the right wheel includes clamps which contact the rim of the wheel and secure the measuring apparatus to the wheel. For example, the mounting structure 24, which is substantially identical with the mounting structure 22, includes a pair of side arms 26 and 28 which extend outwardly and contact the rim of the wheel 12. In addition, a pair of crossbars 30 and 32 extend across the tire and support the clamps. As shown in FIG. 2, a bottom clamp 34 receives the bars and the clamp is used to grasp a portion of the wheel rim. A top adjustable mounting clamp 36 also receives the bars and is used to grasp the wheels. The clamp 36 slides on the bars and is lockable in position on the bars so as to provide for the mounting of the apparatus on the wheel.

Extending from the mounting structures 22 and 24 are the signal generating sensor equipment 38 and 40. Specifically, the equipment 38 includes an inclinometer 42 and an optical projector-detector 44. The equipment 40 includes an inclinometer 46 and an optical projector-detector 48. The projector-detector 48 and projector-detector 44 are used to provide for the measurement of toe and with an optical beam of light projected individually from the projectors to the detectors. The inclinometers 42 and 46 are individually used to provide for the measurement of camber for the right and left vehicle wheels. The specific details of the inclinometer and of the projection system are known in the art and form no part of the present invention. As an example, the Senften U.S. Pat. No. 3,782,831 referred to above includes details of the projector and the detector and the Senften U.S. Pat. No. 3,892,042 includes details of an inclinometer and both patents include other portions of a system for providing for output signals from the projection system and from the inclinometers so as to provide for measurements in the toe and camber planes at different positions as the wheel is rotated.

Output signals from and control signals to the wheel alignment measuring portions of 38 and 40 are provided by electronic equipment such as a microprocessor 50. Specifically, the microprocessor 50 controls the reading of measurements at particular points and provides for calculations in accordance with those measurements and produces runout compensation so as to produce output indications representative of left toe, right toe, left camber and right camber. This is indicated by the four output indicators 52, 54, 56 and 58. The actual taking of the measurements at the different rotative positions of the wheel may be provided by an operating button 60.

FIG. 2 illustrates the right and left vehicle wheels from a view behind the wheels and showing the suspension of the inclinometers such as inclinometer 46 below the axis of rotation such as the axis 16. Since the inclinometer is rotatably mounted on a shaft 62 and with the inclinometer 42 similarly mounted, the major mass of the inclinometer is below the axis of rotation of shaft 62 which ideally is aligned with the axis of rotation 16 of the wheel. The inclinometer 46 as well as the inclinometer 42 and also the projectors-detectors 44 and 48 therefore maintain their angular position relative to the ground line as the wheels 10 and 12 are rotated. In this way, the measurements are made by equipment which remains relatively stationary even as the individual wheels are rotated.

FIG. 4 illustrates, as an example, the right front wheel and the effect when the measurement apparatus is mounted on the wheel along an axis not exactly aligned with the axis 16 of the wheel 12. The effect of such a misalignment in the mounting of the measurement equipment on the wheel as the wheel is rotated, as represented by $\omega$, is a runout circle 64 having a diameter 2r. This runout circle 64 may also be seen in FIG. 5 and is equivalent to an error vector 66 having a length r and with the vector 66 at an angular position $\theta$ depending on the degree of misalignment between the axis of the measurement apparatus and the axis of the wheel.

The misalignment between the axes produces this runout circle which in turn affects the camber and toe measurement apparatus as shown in FIGS. 6a, 6b, 7a and 7b. In 6a, the camber measuring system is shown to include the inclinometer 46 suspended from the wheel 12 by the clamping structure 24. Since, as indicated above, it is probable that there will be an angular relationship between the axis of rotation of the wheel 16 and the axis of rotation of the inclinometer, the inclinometer may therefore produce an undesired error or wobble in the measurement signals. For a particular wobble as shown by the lines radiating from the axis, the limits of the error positions of the inclinometer 46 is shown between the solid and the dotted positions for the inclinometer 46. As the wheel 12 is rotated, measurements in the camber plane may be measured by the inclinometer 46 in a known manner using an accelerometer within the inclinometer to produce at different points output signals representing these measurements. However, this actual measurement in the camber plane includes signals produced by the wobble and thereby necessitates a compensation for this wobble or runout component. This can be seen in FIG. 6b where the actual camber is shown and where the actual measured output signal is shown for varying positions through a full rotation of the wheel and can be seen to be a sine wave which includes a component representative of the wobble.

The same effect is achieved in the toe measurement apparatus as shown in FIG. 7a. In the toe measurement apparatus, the solid and dotted representations of the projector-detector 48 extending from the inclinometer 46 represents the extreme positions produced by a particular wobble or misalignment of axes. Again, as shown in FIG. 7b, the actual toe measurement is masked by the runout component to produce a sine wave which includes the runout component. It can be seen from a comparison of FIG. 6b and FIG. 7b, that the runout components for the camber and for the toe are similar and are always 90° out of phase with each other since the camber is normally related to the vertical plane and the toe is normally related to the horizontal plane. Since the compensation for runout in the camber plane and in the toe plane are related to each other by this 90° phase relation, it is possible to measure the runout in one plane and then mathematically compute the runout necessary in the other plane. The present invention accomplishes this and specifically provides for measurements in the camber plane and computing the runout for the camber and toe planes from these measurements so as to provide for a runout compensation in both the camber and toe planes using only the measurements in the camber plane.

The present invention is described using a three-point runout system wherein measurements are provided at three different points so as to produce the runout compensation for both camber and toe by measurements only in the camber plane. However, it is to be appreciated that this system will work equally as well with other types of runout measurement. In addition, other variations in the system of measurement may be made without deviating from the principles of the present invention such as making the measurement as the wheel is rotating.

FIGS. 8a, 8b and 8c illustrate a specific procedure in providing for a three-point measurement system to produce signals representative of camber and toe and to produce signals which may be used to provide for a runout compensation for the camber and toe while using the measurements only from the camber plane for use in computing this runout compensation for both planes. As shown in FIG. 8a, the measurement apparatus may be mounted on a vehicle wheel such as the right front wheel 12 shown in FIGS. 1 through 3 and with the measuring equipment positioned so that the bars 30 and 32 which are part of the wheel clamping mechanism are in a vertical position. Specifically, as shown in FIG. 2, the adjustable portion 36 may be in the upper positions. This positioning for the equipment is usually a position where there is the most freedom in mounting the measurement equipment to the wheel. It is to be appreciated, however, that the starting position may be at other positions on the wheel. The left wheel would also have the measuring equipment mounted thereon in a similar manner.

Surrounding the wheel 12 are shown three positions marked 1, 2 and 3. An arrow 70 shows that the equipment is initially mounted to be at position 3. In the first step of the measurement procedure, the wheel is rotated 90° counterclockwise to position 1 shown in FIG. 8b. At that time the system is activated, such as by operate button 60 shown in FIG. 1, to provide for a measurement from the inclinometer in the camber plane and from the projection system in the toe plane. After this first measurement is taken, the wheel 12 is turned 180° counterclockwise to position 2 as shown in FIG. 8c. At this time the equipment is again activated to take a reading at the second position. Finally, the wheel is rotated 90° counterclockwise back to position 3 as shown in FIG. 8a and the operate button 60 is again activated to take a reading at the third position. It can be seen, therefore, that readings are taken at each of the positions shown in FIGS. 8a, 8b and 8c. In addition, the wheel is initially rotated 90° from the position shown in FIG. 8a to the position shown in FIG. 8b so as to provide for a total revolution of 360°. The bars 30 and 32 then end up in the position shown in FIG. 8a so that again the equipment is simple to remove. The above procedure would be the same for both the right and left wheels and the only difference would be in the sign of the signals received from the measurement system. However, the microprocessor adjusts for the various sign differences.

FIG. 9 illustrates the runout circle for both camber and toe for both a right and left wheel using the procedure of FIGS. 8a, 8b and 8c to make the adjustments. Even though the rotation of the wheel is in the same direction for either the right or left wheels, since the wheels are opposite each other, this has the effect of providing for an effective rotation in one direction for the right wheel and in the other direction for the left wheel. This is shown by the use of arrows 72 and 74. Arrow 72 would normally represent the direction for the production of signals from the right wheel whereas arrow 74 would represent the direction of rotation for the production of signals for the left wheel.

In either case, starting from some arbitrary position on the runout circle, a first measurement X may be identified as corresponding to position 1 in FIG. 8b for both the right and left wheels. This would be the position when the wheel is rotated 90° from the starting position. At this position, the reading X represents position 1 for both the right and left wheels. The measurement Y which is at a position 180° from the position of the measurement X represents the reading at the second position shown in FIG. 8c for both the right and left wheels. The measurements Z and $Z^1$ which are 90° from the position of the measurements X and Y represent the reading at the third position shown in FIG. 8a for both the left and right wheels. It can be seen, therefore, that the measurements Z and $Z^1$ represent the measurements at the starting positions as shown in FIG. 8a for the left and right wheels respectively. All of the measurements on the runout circle as shown in FIG. 9 are represented by output signals in the camber and toe planes as shown in the vertical and horizontal axes in FIG. 9. The measurements in the vertical axis are in the camber plane and the measurements in the horizontal axis are in the toe plane.

In order to provide for the determination of the camber and toe for both the right and left wheels and using the measurements shown in FIG. 9, and specifically the measurements in the camber plane to provide for runout compensation, the following conditions should be met for the left side of the vehicle.

$C_{OL} = C_L + \Delta C_L \rightarrow \Delta C_L$ should be positive
$T_{OL} = T_L - \Delta T_L \rightarrow \Delta T_L$ should be negative For the right side of the vehicle the following conditions should be met.

$C_{OR} = C_R - \Delta C_R \rightarrow \Delta C_R$ should be negative
$T_{OR} = T_R + \Delta T_R \rightarrow \Delta T_R$ should be positive It can be seen from FIG. 9 that $\Delta T_L$ and $\Delta T_R$ are shown twice, once in the toe plane and once in the chamber plane.

In order to solve these various equations for the toe and chamber for the right and left sides, the readings of the chamber and toe planes are used for $C_L$, $T_L$, $C_R$ and $T_R$. However, only the readings in the chamber plane are used for determining the compensating signals $\Delta C_L$, $\Delta T_L$, $\Delta C_R$ and $\Delta T_R$ and these compensating signals may be solved by more than one equation and the underlined equations would be the proper solutions for the particular three-point measurement system disclosed in this application.

$$\Delta C_L = \left( \frac{X+Y}{2} - Z \right)$$

$$\Delta T_L = -\left( X - \frac{X+Y}{2} \right) \text{ or }$$

$$\underline{\left( \frac{X+Y}{2} - X \right)}$$

$$\Delta C_R = -\left( Z^1 - \frac{X+Y}{2} \right) \text{ or }$$

$$\underline{\left( \frac{X+Y}{2} - Z^1 \right)}$$

$$\Delta T_R = \left( \frac{X+Y}{2} - Y \right) \text{ or }$$

$$\left( X - \frac{X+Y}{2} \right) \text{ or }$$

$$\underline{-\left( \frac{X+Y}{2} - X \right)}$$

It can be seen that all of the various values for $\Delta C_L$, $\Delta T_L$, $\Delta C_R$ and $\Delta T_R$ may be solved in the microprocessor 50 with conventional programming techniques using just the readings from the camber plane and using the various equations described above. In this way, the various runout correction factors are determined from measurements made in the camber plane to provide correction for the measurements $C_L$, $T_L$, $C_R$ and $T_R$ taken at the last measurement position of the wheel. The equations for the values $C_{OL}$, $T_{OL}$, $C_{OR}$ and $T_{OR}$ may also be solved in the microprocessor 50 with conventional programming techniques to provide the output indications by output indicators 52, 54, 56 and 58. This provides for the various advantages specified above and does not necessitate the use of measurements in the toe plane to be used in any way in compensation for runout. Since, as indicated above, measurements in the camber plane are much easier to make, this produces output signals representative of toe and camber compensated for runout in an efficient and accurate manner.

FIG. 10 illustrates the flow chart for programming the microprocessor 50, it being understood that those skilled in the programming art can readily provide a suitable program for the microprocessor to accomplish the functions set forth in the flow chart. The flow chart of FIG. 10 illustrates the procedure for providing the runout corrections for the left wheel of the vehicle using the symbols of FIG. 9 and the equations previously discussed for the left wheel, it being understood that the determination of the runout corrections for the right wheel will be similar. Thus, it will be recognized that each time the operation button, or switch, 60 is pushed, one of the indicated values X, Y or Z will be stored and that when the value Z is stored the program will automatically operated to compute the runout corrections $\Delta T$ and $\Delta C$ for the wheel.

Although the invention has been described with references to specific embodiments, it is to be appreciated that other adaptations and modifications may be made and the invention is only to be limited by the appended claims.

I claim:

1. A method of providing runout compensation for wobble present in the measurements made of the spatial orientation of a rotary body relative to at least a pair of planes, including the following steps:
    providing at least a pair of sensors angularly related to each other and with the sensors rotatably coupled to the body and pendulously supported with respect thereto substantially about the axis of rotation of said rotary body for providing signals representative of the measurements of the angular orientation of the rotary body relative to at least the pair of planes,
    rotating the body through a plurality of rotary positions for providing signals representative of the measurement of the angular orientation of the body relative to the pair of planes at the different rotary positions,
    providing a first output signal representative of the orientation of the body relative to one of the planes in accordance with the measurements at the different rotary positions in the one plane and with the measurements in the one plane used to provide a runout compensation for wobble present in the measurements, and
    providing a second output signal representative of the orientation of the body relative to the other of the planes in accordance with the measurements at the different rotary positions in the other plane and with the measurements in the one plane used to provide a runout compensation for wobble present in the measurements in the other plane.

2. The method of claim 1 wherein the two planes are perpendicular to each other and wherein the pair of sensors provide measurements with respect to the two planes perpendicular to each other.

3. The method of claim 1 wherein the body is a vehicle wheel and the two planes represent the camber and toe planes of the vehicle wheel and the measurements by the sensors are made with respect to the camber and toe planes.

4. The method of claim 3 wherein the measurements in the camber plane are used to provide runout compensation for measurements with respect to both the camber and toe planes.

5. The method of claim 1 including the step of mounting the sensors on the body to provide measurements with respect to the pair of planes.

6. The method of claim 5 wherein the body is a vehicle wheel and the two planes represent the camber and toe planes of the vehicle wheel.

7. A method of providing runout compensation for wobble present in the measurements made of the spatial orientation of a vehicle wheel relative to the camber and toe planes, including the following steps:
    providing a pair of sensors angularly related to each other and with the sensors rotatably coupled to the wheel and pendulously supported with respect thereto substantially about the axis of rotation of said wheel for providing signals representative of the measurements of the angular orientation of the wheel relative to the camber and the toe planes,
    rotating the wheel through a plurality of rotary positions for providing signals representative of the measurement of the angular orientation of the wheel relative to the camber and to the toe planes at the different rotary positions,
    producing a first runout compensation signal for providing compensation for the wobble in the orientation of the wheel relative to one of the planes in accordance with the measurements at the different rotary positions in the one plane, and
    producing a second runout compensation signal for providing compensation for the wobble in the orientation of the wheel relative to the other of the planes in accordance with the measurements at the different rotary positions in the one plane and with the measurements in the one plane used to provide runout compensation for wobble present in both planes.

8. The method of claim 7 wherein the one plane is the camber plane and with the measurements with respect to the camber plane providing runout compensation for both the camber and toe planes.

9. The method of claim 8 including the step of providing the runout compensation signals for measurements made with respect to the camber and toe planes for output signals representing camber and toe.

10. The method of claim 7 including the step of mounting the sensors on the wheel to provide measurements with respect to the camber and toe planes.

11. An apparatus for providing runout compensation for wobble present in the measurements made of the orientation of a rotary body relative to at least a pair of planes, including at least a pair of sensors angularly related to each other and with the sensors including means for rotatably coupling them to the body so that they are pendulously supported with respect thereto substantially about the axis of rotation of the body, said sensors including means for producing signals representative of the measurements of the angular orientation of the rotary body at a plurality of rotary positions of the body and with the measurements being relative to at least the pair of planes, and means coupled to the pair of sensors and responsive to the signals representative of the measurements of the rotary body at the plurality of rotary positions for producing a first output signal representative of the orientation of the body relative to one of the planes in accordance with the measurements at the different positions in the one plane and with the measurements in the one plane providing a runout compensation for wobble present in the measurements and wherein the means produces a second output signal representative of the orientation of the body relative to the other of the planes in accordance with the measurements at the different positions in the other plane and with the measurements in the one plane providing a runout compensation for wobble present in the measurements in the other plane.

12. The apparatus for providing runout compensation of claim 11 wherein the two planes are perpendicular to each other and wherein the pair of sensors produce measurements with respect to the two planes perpendicular to each other.

13. The apparatus for providing runout compensation of claim 11 wherein the body is a vehicle wheel and the two planes represent the camber and toe planes of the wheel and the measurements by the sensors are made with respect to the camber and toe planes.

14. The apparatus for providing runout compensation of claim 13 wherein the measurements with respect to the camber plane provide runout compensation for measurements with respect to both the camber and toe planes.

15. The apparatus for providing runout compensation of claim 11 additionally including means for mounting the sensors on the body for directly providing measurements with respect to the pair of planes.

16. The apparatus for providing runout compensation of claim 15 wherein the body is a vehicle wheel and the two planes represent the camber and toe planes of the vehicle wheel.

* * * * *

UNITED STATES PATENT AND TRADEMARK OFFICE
CERTIFICATE OF CORRECTION

PATENT NO. : 4,138,825
DATED : February 13, 1979
INVENTOR(S) : PELTA, EDMOND R.

It is certified that error appears in the above—identified patent and that said Letters Patent is hereby corrected as shown below:

Column 8, line 27 "chamber" should be --camber--

Column 8, line 29 "chamber" should be --camber--

Column 8, line 30 "chamber" should be --camber--

Column 8, line 31 "chamber" should be --camber--

Signed and Sealed this

Sixteenth Day of December 1980

[SEAL]

Attest:

SIDNEY A. DIAMOND

Attesting Officer  Commissioner of Patents and Trademarks